United States Patent
Rao et al.

(10) Patent No.: US 11,023,323 B2
(45) Date of Patent: Jun. 1, 2021

(54) PROTECTING DATA MEMORY IN A SIGNAL PROCESSING SYSTEM

(71) Applicant: TEXAS INSTRUMENTS INCORPORATED, Dallas, TX (US)

(72) Inventors: Sandeep Rao, Bangalore (IN); Karthik Ramasubramanian, Bangalore (IN); Brian Paul Ginsburg, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/788,004

(22) Filed: Feb. 11, 2020

(65) Prior Publication Data
US 2020/0174884 A1    Jun. 4, 2020

Related U.S. Application Data

(63) Continuation of application No. 14/985,851, filed on Dec. 31, 2015, now Pat. No. 10,599,518.

(51) Int. Cl.
*G06F 11/10* (2006.01)
*G01S 13/42* (2006.01)
(Continued)

(52) U.S. Cl.
CPC .......... *G06F 11/1076* (2013.01); *G01S 7/352* (2013.01); *G01S 13/34* (2013.01);
(Continued)

(58) Field of Classification Search
CPC ............. G06F 11/1076; G06F 11/1012; G06F 3/0673; G06F 3/064; G06F 3/0619;
(Continued)

(56) References Cited

U.S. PATENT DOCUMENTS

| 5,856,989 | A | * | 1/1999 | Oldfield | .............. | G06F 11/1076 |
| | | | | | | 714/799 |
| 6,233,717 | B1 | | 5/2001 | Choi | | |
| | | | | (Continued) | | |

FOREIGN PATENT DOCUMENTS

| EP | 0348240 | 12/1989 |
| EP | 2876460 | 5/2015 |

OTHER PUBLICATIONS

European Patent Office Art Cite, Nov. 28, 2018.
(Continued)

*Primary Examiner* — Cynthia Britt
(74) *Attorney, Agent, or Firm* — Ronald O. Neerinqs; Charles A. Brill; Frank D. Cimino

(57) ABSTRACT

Data memory protection is provided for a signal processing system such as a radar system in which the data memory is protected with a common set of parity bits rather than requiring a set of parity bits for each memory word as in Error Correction Coded (ECC) memories. The common set of parity bits may be updated as memory words in the data memory are accessed as part of signal processing of one or more digital signals. The memory protection ensures that in the absence of memory errors the common parity bits are zero at the end of processing the digital signals as long as each word in the data memory that is used for storing the signal processing data is written and read an equal number of times.

23 Claims, 12 Drawing Sheets

(51) Int. Cl.
  *G01S 13/34* (2006.01)
  *G01S 13/931* (2020.01)
  *G01S 13/58* (2006.01)
  *G01S 7/35* (2006.01)
  *G06F 3/06* (2006.01)

(52) U.S. Cl.
  CPC ............ *G01S 13/42* (2013.01); *G01S 13/583* (2013.01); *G01S 13/931* (2013.01); *G06F 3/064* (2013.01); *G06F 3/0619* (2013.01); *G06F 3/0673* (2013.01); *G06F 11/1012* (2013.01); *G01S 2007/356* (2013.01)

(58) Field of Classification Search
  CPC ...... G01S 13/931; G01S 13/583; G01S 13/42; G01S 13/34; G01S 7/352; G01S 2007/356
  See application file for complete search history.

(56) References Cited

U.S. PATENT DOCUMENTS

| | | |
|---|---|---|
| 6,868,516 B1 | 3/2005 | Walton et al. |
| 8,255,764 B1 | 8/2012 | Yeo et al. |
| 9,003,264 B1 | 4/2015 | Prins |
| 9,189,334 B2 | 11/2015 | Bennett |
| 2005/0149839 A1 | 7/2005 | Dent |
| 2005/0268019 A1 | 12/2005 | Chang et al. |
| 2007/0089044 A1 | 4/2007 | Goma et al. |
| 2009/0210774 A1 | 8/2009 | Godard et al. |
| 2014/0059301 A1 | 2/2014 | Rao |
| 2014/0201597 A1 | 7/2014 | Hoekstra et al. |
| 2015/0220385 A1 | 8/2015 | Wood et al. |

OTHER PUBLICATIONS

Patent Cooperation Treaty Office Art Cite, Apr. 13, 2017.
Vojin G. Oklobdzija, "An Algorithmic and Novel Design of a Leading Zero Detector Circuit: Comparison With Logic Synthesis", IEEE Transactions on Very Large Scale Integration (VLSI) Systems, vol. 2, No. 1, Mar. 1994, pp. 124-128.
M. Nicolaidis, "Design for Soft Error Mitigation", in IEEE Transactions on Device and Materials Reliability, vol. 5, No. 3, Sep. 2005, pp. 405-418.
"ECC Memory", Wikipedia, available at https://en.wikipedia.org/wiki/ECC_memory on Dec. 2, 2015, pp. 1-7.
P. Reviriego, et al., "Improving Memory Reliability Against Soft Errors Using Block Parity", in IEEE Transactions on Nuclear Science, vol. 58, No. 3, pp. 981-986, Jun. 2011.
"Soft Error", Wikipedia, available at https://en.wikipedia.org/wiki/Soft_error on Dec. 2, 2015, pp. 1-8.

* cited by examiner

FIG. 1

PROTECTING DATA MEMORY IN A SIGNAL PROCESSING SYSTEM

This application is a Continuation of application Ser. No. 14/985,851 filed Dec. 31, 2015.

BACKGROUND OF THE DISCLOSURE

Field of the Disclosure

Embodiments of the present disclosure generally relate to signal processing systems, and more specifically relate to protecting signal data memory in signal processing systems.

Description of the Related Art

The use of embedded Frequency Modulated Continuous Wave (FMCW) radar systems in automotive applications is evolving rapidly. For example, embedded FMCW radar systems may be used in a number of applications associated with a vehicle such as adaptive cruise control, collision warning, blind spot warning, lane change assist, parking assist and rear collision warning. In order to be used in automotive applications, an embedded FMCW radar system is required to meet stringent functional safety requirements. Functional safety in automotive radar is the prevention of harm to humans due to failure of components in the radar. Meeting these requirements necessitates the inclusion of various protection mechanisms in the radar system that minimize or eliminate failures due to malfunction of components such as, for example, any processors, digital logic, and memory incorporated in the radar system. Other signal processing systems may also include similar protection mechanisms when used in environments with stringent functional safety requirements.

SUMMARY

Embodiments of the present disclosure relate to methods and apparatus for protection of signal data memory in signal processing systems such as, for example, radar systems. In one aspect, a signal processing system comprising is provided that includes a data memory component configured to store values corresponding to signal processing of at least one digital signal, a plurality of parity bits associated with the data memory component, the plurality of parity bits including a set of group parity bits for each group of memory words of a plurality of groups of memory words in the data memory component, a processor coupled to receive the at least one digital signal, the processor configured to perform the signal processing of the at least one digital signal and to check the plurality of parity bits for a memory error, and a parity management component coupled to the plurality of parity bits and coupled to receive an address of a memory word in the data memory component and a value read from or written to the memory word by the processor during the signal processing, the parity management component configured to update group parity bits in the plurality of parity bits corresponding to the address of the memory word based on the value.

In one aspect, a method for data memory protection in a signal processing system is provided that includes dividing memory words of a data memory of the signal processing system into a plurality of groups, in which a plurality of parity bits associated with the data memory includes a set of group parity bits for each group of the plurality of groups, performing signal processing on a least one digital signal, in which each memory word of a plurality of memory words of the data memory is written and read such that for each write of a value to a memory word of the plurality of memory words, group parity bits corresponding to a group of the memory word are updated based on the value and a single read of the value from the memory word is performed in which the group parity bits are updated based on the value, and determining whether a soft error has occurred based on the plurality of parity bits.

BRIEF DESCRIPTION OF THE DRAWINGS

Particular embodiments will now be described, by way of example only, and with reference to the accompanying drawings:

FIG. 1 is an example illustrating the affect of a single soft error on memory;

DETAILED DESCRIPTION OF EMBODIMENTS OF THE DISCLOSURE

Figure 2:
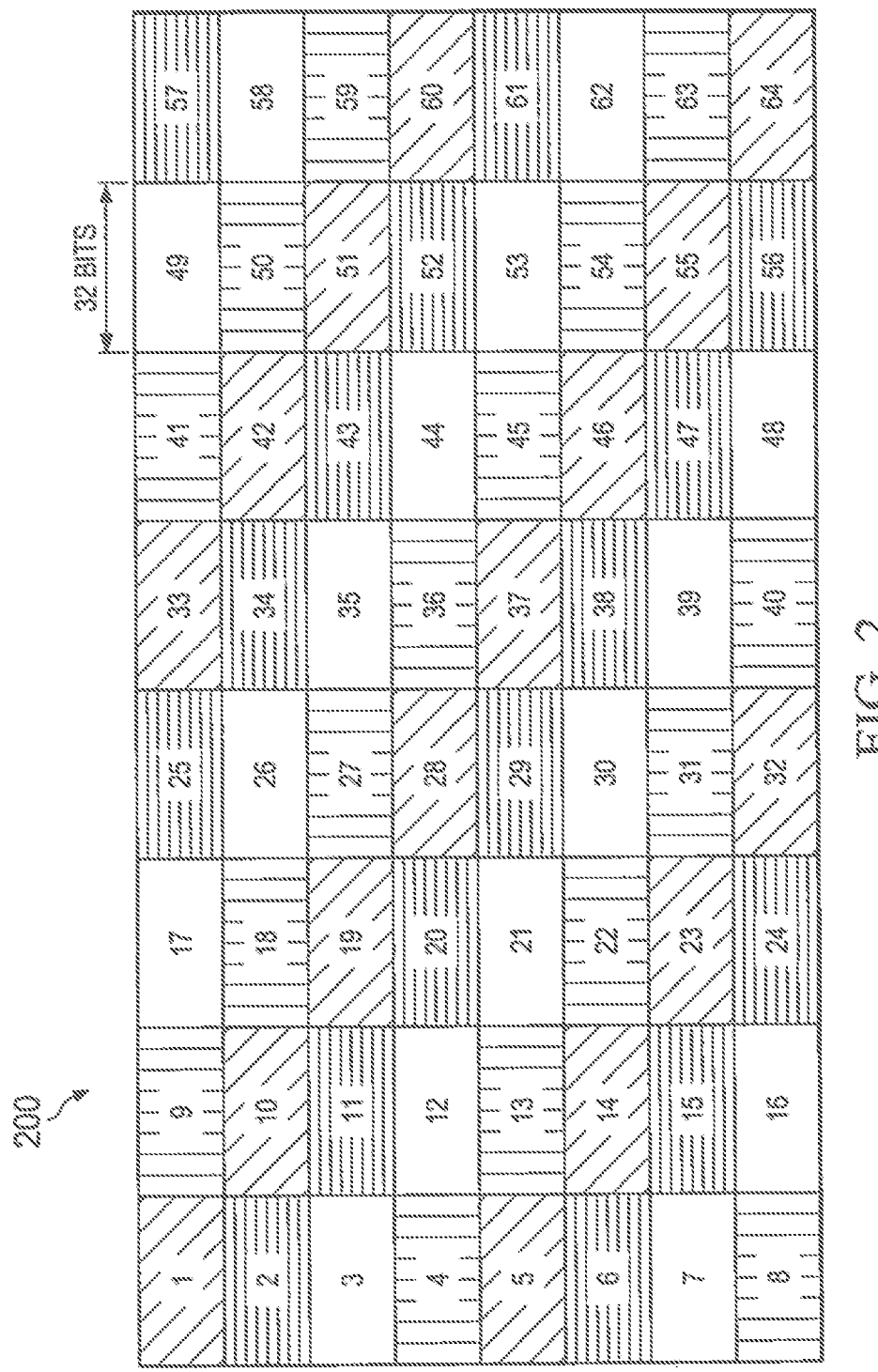
FIG. 2 is an example illustrating a radar data memory with a diagonal grouping.

Specific embodiments of the disclosure will now be described in detail with reference to the accompanying figures. Like elements in the various figures are denoted by like reference numerals for consistency.

A Frequency Modulated Continuous Wave (FMCW) radar transmits, via one or more transmit antennas, a radio frequency (RF) frequency ramp referred to as a chirp. Further, multiple chirps may be transmitted in a unit referred to as a frame. The transmitted chirps are reflected from any objects in the field of view (FOV) the radar and are received by one or more receive antennas. The received signal for each receive antenna is down-converted to an intermediate frequency (IF) signal and then digitized. The digitized samples are pre-processed and stored in memory, which is referred to as radar data memory herein. Once the data for an entire frame is stored in the radar data memory, the data is post-processed to detect any objects in the FOV and to identify the range, velocity and angle of arrival of detected objects.

The pre-processing may include performing a range Fast Fourier Transform (FFT) on the digitized samples of each reflected chirp to convert the data to the frequency domain. Peak values correspond to ranges (distances) of objects. This processing is usually performed in-line, meaning that the range FFT is performed on the digitized samples of a previous chirp while samples are being collected for the current chirp. The results of the range FFTs for each receive antenna are saved in the radar data memory for further processing. $K_1$ range results are stored for the chirp. Thus, if there are $K_2$ chirps in a frame, an array of $K_1 \times K_2$ range values is generated by the range FFTs. In this array, each of the $K_1$ columns corresponds to a specific range value across the $K_2$ chirps. Note that $K_1 \times K_2$ range values are generated for each receive channel in the system.

For each range, a Doppler FFT is performed over each of the corresponding range values of the chirps in the frame. That is, a Doppler FFT is performed on each of the $K_1$ columns of the $K_1 \times K_2$ array. The peaks in the resulting $K_1 \times K_2$ range-Doppler array correspond to the range and relative speed (velocity) of potential objects. To perform the Doppler FFTs, each column of range values is read from the radar data memory and a Doppler FFT is performed on the range values of the column. The Doppler FFT values may be stored back in the same column memory locations.

After the Doppler FFTs, other post-processing, e.g., object detection and angle estimation, may be performed on the $K_1 \times K_2$ range-Doppler array stored the radar data memory to detect objects in the FOV and to identify the range, velocity and angle of arrival of detected objects. Once the post-processing is complete, the data in the radar data memory can be discarded.

Note that all the digitized data corresponding to a frame is required to be in the radar data memory before the post-processing such as Doppler FFT, angle estimation, object detection, etc., can begin. Further, resolution expectations, i.e., range resolution, which is controlled by the number of digitized samples per chirp, velocity resolution, which is controlled by the number of chirps per frame, and angle resolution, which is controlled by the number of receive antennas, directly impact the size of the radar data memory. In the automotive radar application space, the current radar data memory size needed is on the order of one to two megabytes (MB) and is expected to increase in coming years as increased resolution is demanded.

As was previously mentioned, the functional safety requirements for use of an embedded radar system in automotive applications necessitate the incorporation of protection mechanisms for various components of the system. Radar data memory is one of the components that need an effective protection mechanism. Soft errors, which change the value of one or more bits in a memory location, are one category of memory error that is of concern. Soft errors may be caused by radiation or radioactive particles striking a memory cell causing the cell to change state, i.e., a '1' changes to a '0' or vice-versa.

The current industry solution for soft error protection is using Error Correction Coded (ECC) memory. In an ECC memory, each word in memory is protected by a set of parity bits. Whenever data is written to a specific memory word, the parity value corresponding to this data are computed and stored in the associated parity bits. When the memory word is read, the parity value is recomputed and validated against the stored parity value. Any difference between the stored and recomputed parity values indicates the presence of bit errors.

Depending on the specific parity code used, the parity bits can be used either to detect bit errors or to detect and correct bit errors. Some typical ECC memories use an extended Hamming code parity scheme with the capability to correct a single bit error and detect up to two bit errors in a word. The number of parity bits needed for an extended Hamming code scheme depends on the length of the memory word. For example, a sixteen bit memory word would require six parity bits and a thirty-two bit memory word would require seven parity bits.

The size of a memory word in ECC memory is chosen as the smallest unit in which data is expected to be read/written. In the context of the radar data memory, the memory word size is based on the typical size of a complex sample, e.g., 32 bits. Thus implementing an extended Hamming code parity scheme for radar data memory would require an overhead of seven bits for every thirty-two bits, which is an overhead of approximately 22%. Thus, approximately 400 KB (kilobytes) of overhead would be needed for 2 MB of radar data memory. This is a significant amount of overhead for cost-sensitive embedded radar solutions.

Embodiments of the disclosure provide an alternate technique for radar data memory protection with minimal overhead. This memory protection technique is based on two key observations regarding radar data memory. One observation is that most accesses to radar data memory are not random. Instead, there is a well defined write phase during pre-processing of received signals corresponding to a frame of chirps in which range values are stored in the memory. This write phase is followed by a read phase during post-processing of the stored range values in which all the range values are read, although not in the same order in which the values were stored. The other observation is that error correction is not very important for radar data memory. Error detection is sufficient because the data read and written in radar data memory is independent from one frame of chirps to the next. If a memory error is detected during post-processing, the data in the memory can be discarded.

Embodiments of the radar data memory protection technique provide for protection of the entire radar data memory with a common set of parity bits rather than requiring a set of parity bits for each memory word as in ECC memories. These common parity bits may be updated each time a word in the radar data memory is read or written as part of the radar data processing. As is explained in more detail herein, the protection technique ensures that in the absence of memory errors the common parity bits are zero at the end of processing the radar data corresponding to a frame of chirps as long as each word in the radar data memory that is used for storing the radar data is written and read an equal number of times. A non-zero value in any of the common parity bits at the end of processing indicates at least one memory error.

In embodiments of the radar data memory protection, radar data memory is divided into non-overlapping groups and each group is protected by a set of parity bits in the common parity bits. In some embodiments, the grouping is selected to ensure that a single soft error affects a maximum of one word per group. The parity check technique used is based on the number of soft errors to be protected against. For example, as is explained in more detail herein, a simple check sum scheme may be used if single soft error protection is needed while a Hamming code scheme may be used if protection for two soft errors is needed.

Figure 1:
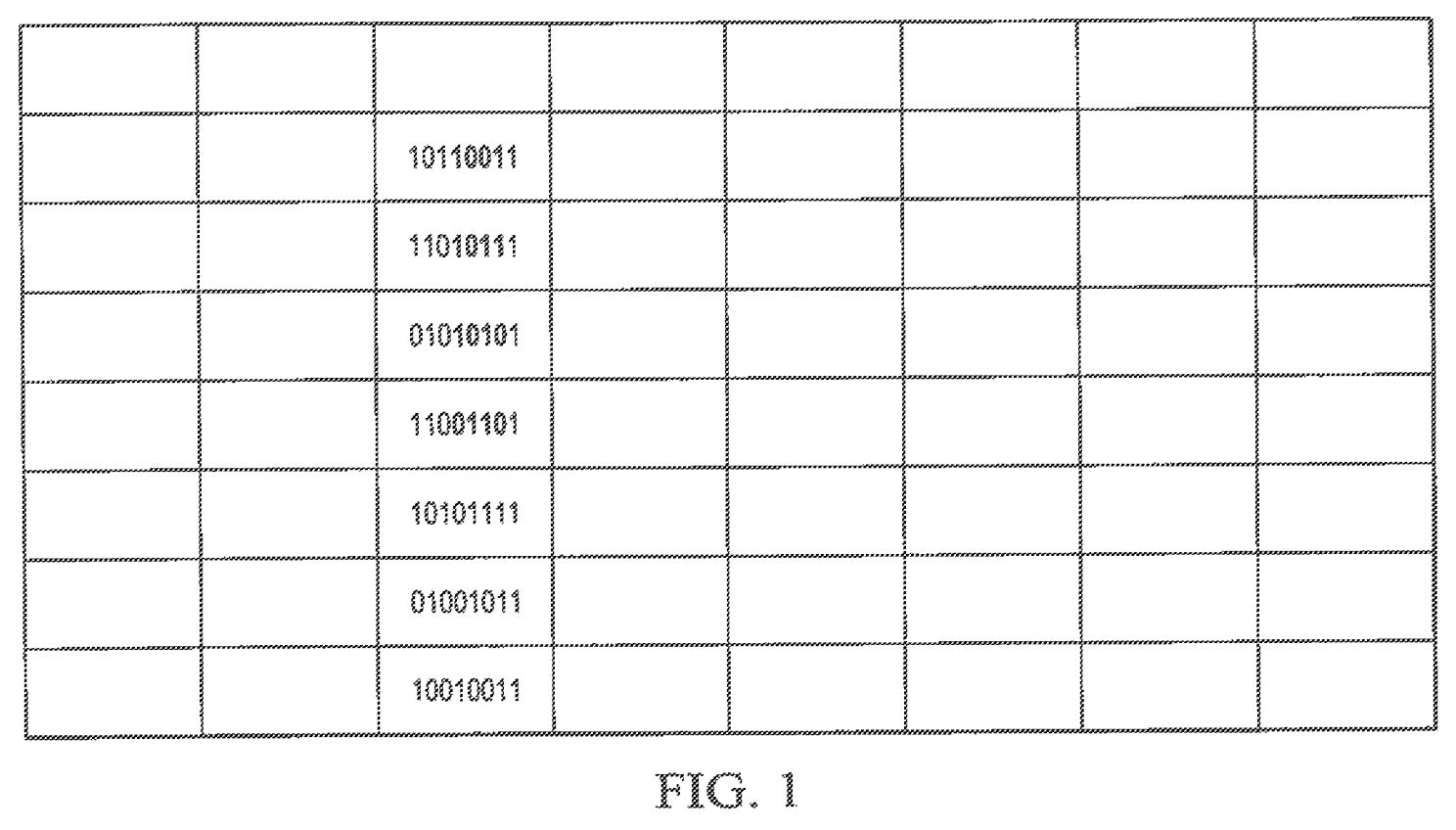

As previously mentioned, a soft error is a radiation induced bit flip in memory. As is illustrated in the example of FIG. 1, a single soft error can cause bit errors in multiple adjacent bits in memory, both row-wise and column-wise, thus multiple adjacent bits in a single word as well as multiple column-wise adjacent words can be in affected by a single soft error. In the example of FIG. 1, a single soft error has affected four column-wise adjacent 8-bit words, with four affected adjacent bits in each word. The example of FIG. 1 assumes that the maximum number of adjacent bit affected and the maximum number of column-wise adjacent words affected is four.

In some embodiments of the radar data memory protection, the radar data memory is divided into M non-overlapping groups where the value of M is chosen such that a single soft error affects no more than one word per group. In some embodiments, the maximum number of adjacent bits in a single word and the maximum number of column-wise adjacent words affected by a single soft error are the same and M is set to be this maximum number. In some embodiments, the maximum number of adjacent bits affected and the maximum number of column-wise adjacent words affected is not the same and M is set to be the larger of the two numbers. Note that the maximum number of adjacent bits affected and the maximum number of column-wise adjacent words affected may increase as the level of miniaturization increases. In other words, the value of M depends on factors such as the physics of the memory device and the memory architecture.

For simplicity of explanation, radar data memory protection is initially described in reference to the examples of FIGS. 2, 3, 5, and FIGS. 8-10, which assume M=4, a 32-bit memory word, and a direct memory access (DMA) controller that can transfer up to four consecutive 32-bit words in a cycle. In these examples, each cell represents a 32-bit word and the cells are "shaded" to indicate group assignment. To avoid memory stalling and throughput less, the words are grouped diagonally such that four adjacent words both row-wise and column-wise are in different groups. The diagonal grouping depicted in the examples is from top-left to bottom right. As will be understood by one of ordinary skill in the art based on the description herein, such a grouping ensures that no parity word needs to be updated more than once per memory cycle. FIG. 2 is an example illustrating a radar data memory 200 with a diagonal grouping. Each memory cell is "shaded" to indicate group assignment. Each memory cell is also numbered for descriptive purposes.

Each of the M groups is protected by a set of parity bits, which may be referred to as group parity bits herein. The number of parity bits needed for each group and how the parity bits are updated during memory accesses depends on the functional safety requirements of the particular application of the radar system. In some embodiments, the memory protection protects against a single soft error occurrence during the processing of radar data for a frame of chirps. In such embodiments, a parity bit is allocated for the protection of each bit position of the words assigned to a group. For example, for a 32-bit memory word, there are 32 bit positions and thus, a 32-bit parity word is needed for each group. Thus, M 32-bit parity words are needed. Further, as is explained in more detail in reference to the method of FIG. 4, the value stored in the associated parity word is essentially the checksum of the memory group.

Figure 3:
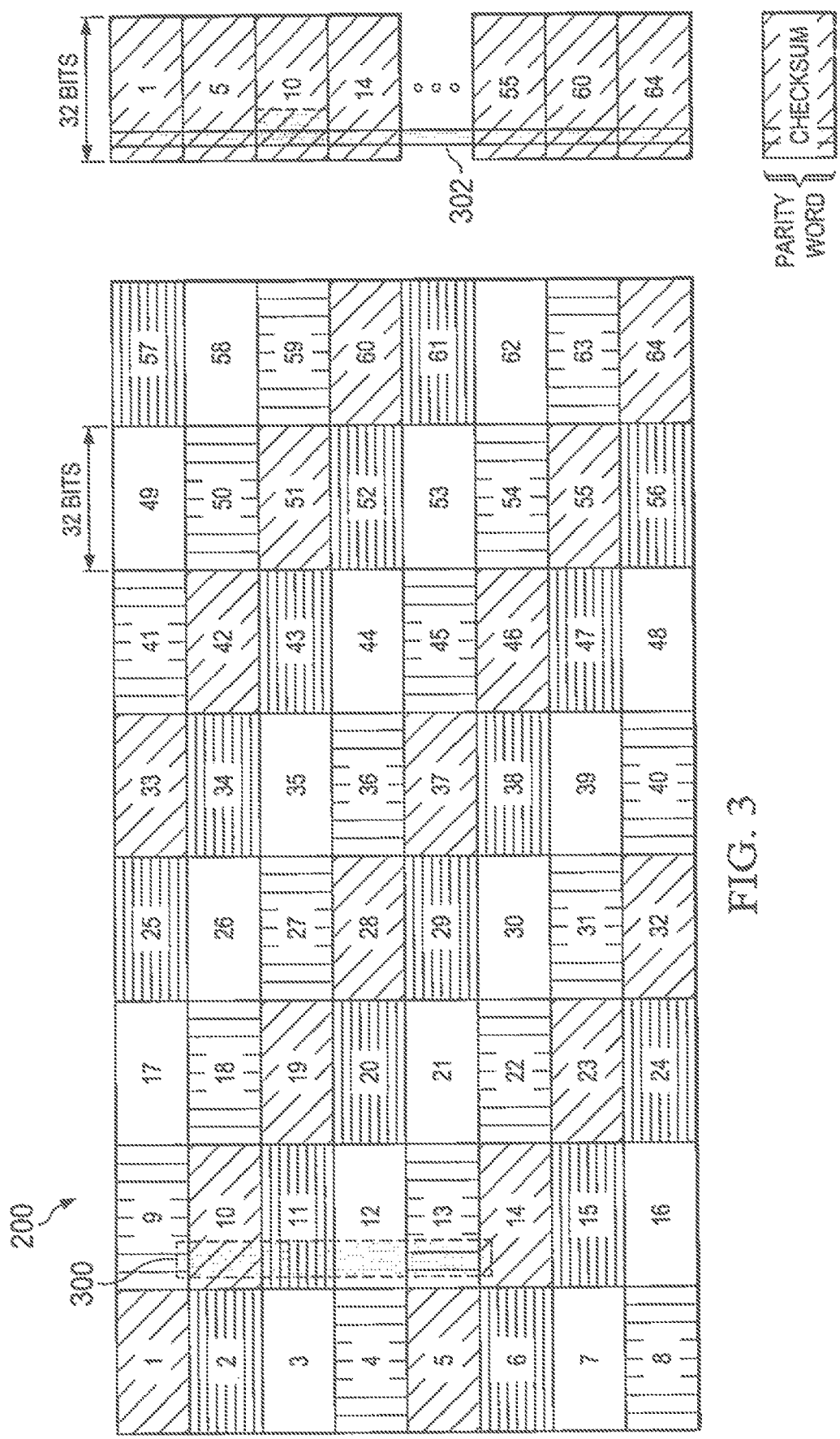
FIG. 3 is an example illustrating parity bit assignment for the radar data memory of FIG. 2 for protection against one soft error occurrence.

FIG. 3 is an example illustrating this parity bit assignment for the radar data memory 200. In this example, the memory words 1, 5, 10, 14, . . . , 55, 60, 64 are assigned to the same group. The M×M area 300 illustrates an example portion of memory that may be affected by a single soft error. As the area 300 shows, dividing radar data memory into M groups in this manner ensures that the single soft error affects no more than one word per group. On the right side of FIG. 3, the memory words for this group are stacked vertically for illustration and the associated 32-bit parity word is shown below the stack. An example column 302 of bits at an illustrative bit position in each word of the group along with the associated parity bit in the parity word is also shown.

Figure 4:
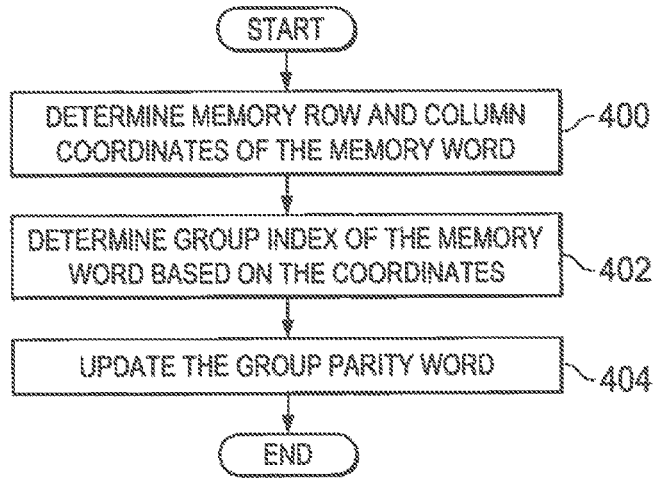
FIG. 4 is a flow diagram of a method for updating parity words of a radar data memory.

FIG. 4 is a flow diagram of a method for updating parity words of a radar data memory assuming the above described memory protection for a single soft error. The method is performed for a read or a write of a memory word in the radar data memory. When a memory word is accessed, the row and column coordinates in the radar data memory of the memory word are determined 400 based on the address of the memory word. The row number of an address may be computed as R=floor(Address/NumColumns) and the column number of an address may be computed as C=mod(Address, NumColumns) where NumColumns is the number of columns in the radar data memory and the function mod refers to the modulo operator in which the result of mod(a, b) is the remainder of a divided by b. In the above equation, the memory words are assumed to be addressed horizontally across rows. Further the address of the memory word, the row number R, and the column number C are enumerated from zero. The number of columns and rows of a memory are determined by the memory design.

The group index of the memory word is then determined 402 based on the row and column coordinates. Assuming the groups are indexed 0, 1, . . . , M−1, an index identifying the group of the memory word, group_idx, may be computed as per $$\text{group\_idx}=\text{mod}(R-\text{mod}(C,M),M)$$

where R is the memory row number and C is the memory column number of the memory word. The group parity word, as identified by the group index, is then updated 404. More specifically, the parity word identified by the group index is updated by performing an XOR operation between the data of the memory word and the current contents of the identified parity word.

Figure 5:
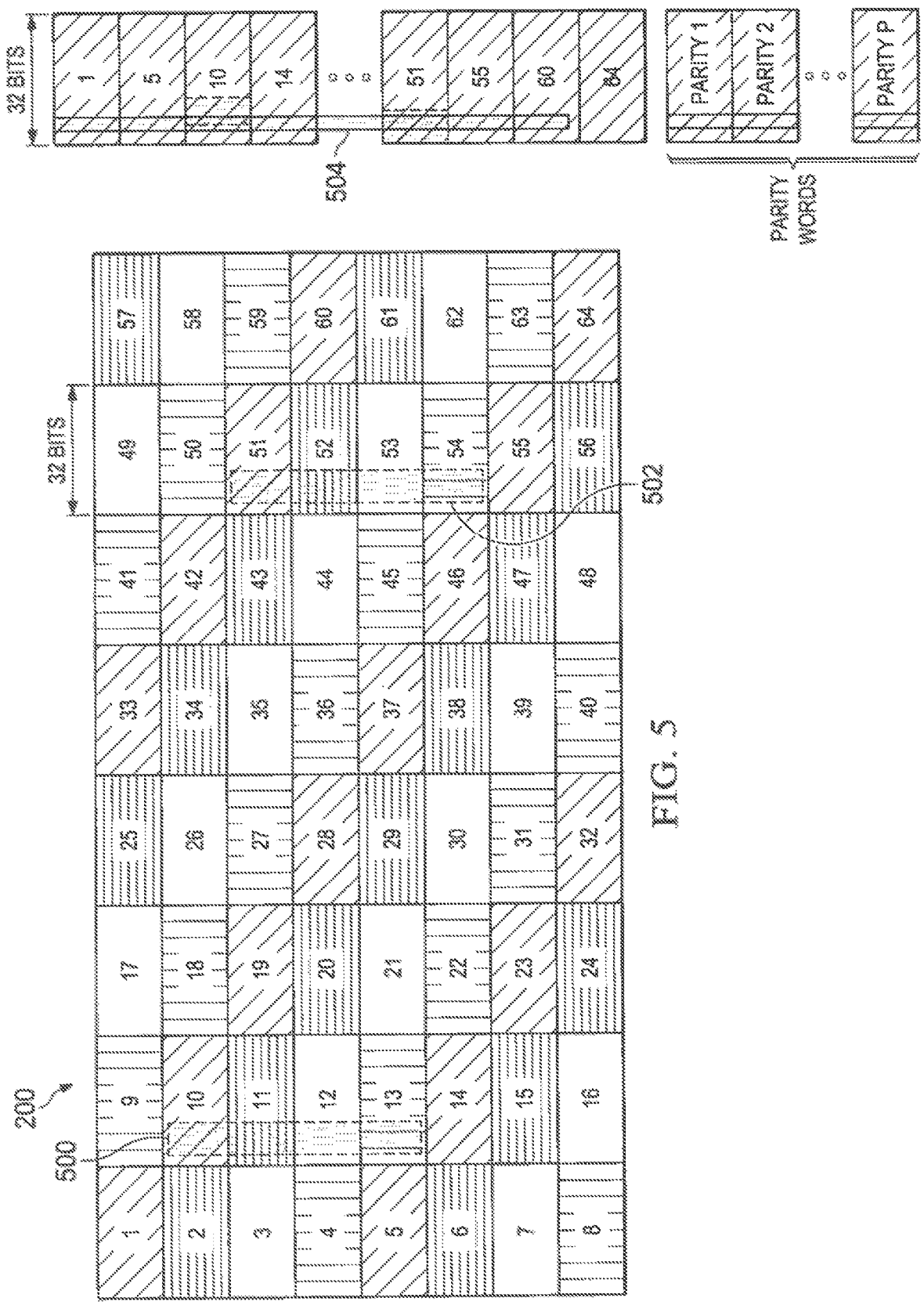
FIG. 5 is an example illustrating parity bit assignment for the radar data memory of FIG. 2 for protection against two soft error occurrences.

In some embodiments, the memory protection protects against two soft error occurrences during the processing of radar data for a frame of chirps. Thus, up to two words in each group may be affected by the soft errors. FIG. 5 is an example illustrating the radar data memory 200 affected by two soft errors designated by the M×M area 500 and the M×M area 502. In this example, two words from each group are affected. In such embodiments, a set of P parity bits is allocated for the protection of each bit position of the words assigned to a group. For example, for a 32-bit memory word, there are 32 bit positions, and thus P 32-bit parity words are needed for each group. Thus, M×P 32-bit parity words are needed. As is explained in more detail herein, the P parity bits correspond to a Hamming code that detects up to two bit errors.

FIG. 5 illustrates this parity bit assignment. In this example, the memory words 1, 5, 10, 14, . . . , 55, 60, 64 are assigned to the same group. On the right side of FIG. 5, the memory words for this group are stacked vertically for illustration and the associated P 32-bit parity words are shown below the stack. An example column 504 of bits at an illustrative bit position in each word of the group along with the associated parity bits in the parity words is also shown. Each such column of bits in a group is protected by a column of P parity bits. Thus, each column in a group can be viewed as a Hamming code word of N data bits where N is the number of memory words in the group and P parity bits. Thus, the thirty-two columns of a group can be viewed as thirty-two Hamming code words each capable of detecting up to two errors.

A Hamming code is chosen because a Hamming code can detect up to two bit errors in a given input bit stream. For a given input bit stream of N bits, a Hamming code computes P parity bits. The number of parity bits P depends on the number of input bits N and any suitable value of P may be used. In some embodiments, the value of P is chosen as the smallest P that satisfies the following relation: $N > 2^P - P - 1$.

Hamming encoders are generally described assuming that the N input bits are a priori available to the encoder and can be used to determine the parity bits. However, in embodiments of the radar data memory protection, this will not be the case. The input stream to the Hamming code is a stream of N words, i.e., the words in a group. Thus, the parity bits need to be determined as individual memory words in the N input words are accessed. Further, the memory access pattern is not pre-determined which means that the words in a group cannot be assumed to be accessed in any specific order. Embodiments of the radar memory protection thus implement a technique for updating the parity bits of the Hamming code that does not assume all N words of a group are available at a given time or that the N words are accessed in any particular order.

Consider a Hamming encoder that takes in a sequence of N input bits to compute P parity bits. A Hamming code has the property that, in the process of computing the parity bits, every bit in the input bit sequence is required to update a unique subset of the P parity bits that includes at least two parity bits. For example, the first input bit updates parity bits 1 and 2, the second input bit updates parity bits 1 and 3, the third input updates parity bits 2 and 3, the 4$^{th}$ input bit updates parity bits 1, 2, and 3, etc. Thus, the subset of parity bits updated by a specific input bit depends on the ordinality of that input bit.

More specifically, let G be the ordered sequence of numbers in which each number in the sequence has a binary representation including two or more one bits, i.e., $$G = \{3,5,6,7,9,10,11,12,13,14,15,17,\ldots\}.$$

This sequence is essentially all numbers that are not powers of two. The set of parity bits associated with the kth bit in the input stream is given by the binary representation of G(k), i.e., by the binary representation of the number in the kth position in sequence G, k>0. For example, if k=5, then G(k)=9=1001, thus indicating that 5th input bit is associated with parity bits 1 and 4.

Further, G(k) can be computed as per $$G(k) = L(L(k)+k)+k$$

where L(n) is a function that outputs the index of the left most non-zero bit of the binary representation of n. For example, L(9) is 4 and L(18) is 5. If k=4, L(k)=3, L(L(k)+k)=L(3+4)=L(7)=3, and L(L(k)+k)+k=3+4=7. Thus, G(4)=7 and given the binary representation of seven is 0111, this indicates that the parity bits to be updated are parity bits 1, 2, and 3.

Figure 6:
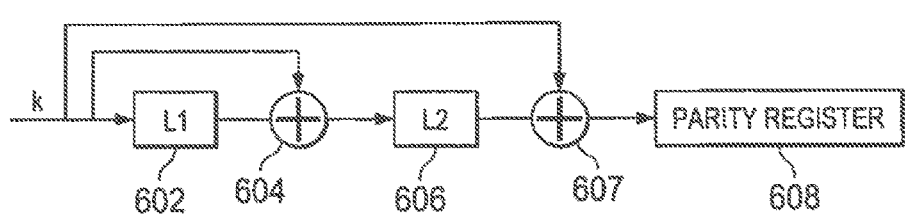
FIG. 6 is a block diagram of a parity identification circuit.

FIG. 6 illustrates a parity identification circuit 600 that may be implemented in a radar system to determine G(k) as per the above equation. The input to the identification circuit 600 is the binary representation of k and the output is a P-bit parity register 608. The components L1 602 and L2 606 each output the binary representation of the index of the left most non-zero bit of the binary representation of the input to the respective component. The adder 604 coupled between the components L1 602 and L2 606 adds the output of the L1 component 602 to the binary representation of k and provides the result to the L2 component 606. The adder 607 coupled to the output of the component L2 606 adds the output of the L2 component 606 to the binary representation of k and provides the result to the parity register 608. The components L1 602 and L2 606 may be implemented using any suitable circuit design. Some suitable circuit designs that may be used are described in V. Oklobdzija, "An Algorithmic and Novel Design of a Leading Zero Detector Circuit: Comparison with Logic Synthesis", IEEE Transactions on Very Large Scale integration (VLSI) Systems, Vol. 2, No. 1, March 1994, pp. 124-128.

The input to L1 602 is k, and the input to L2 606 is the output of L1 added to k. The output of L2 606 is again added to k to produce the final result, i.e., G(k). The bit representation of this final result is stored in the parity register 608. The indices of the non-zero bits in the parity register 608 identify the parity bits associated with the input bit of ordinality k. For example, if k=5, the parity register 608 will contain the bit sequence 10010 . . . 0, thus indicating that parity bits 1 and 4 are associated with the 5$^{th}$ input bit.

The above description illustrated updating P parity bits based on a sequence of N input bits. In the case of radar data memory, P parity words associated with N input memory words are updated, where N is the number of memory words in a group. As is explained in more detail in reference to the method of FIG. 6, when a word of the N words of a group is accessed, the subset of parity words of the P parity words that are associated with the word may be identified in a similar fashion to the bit identification process described above once the ordinality of the word in the group is determined. In other words, G(k) where k is the ordinality of a word in a group identifies which of the parity words for the group are to be updated.

Figure 7:
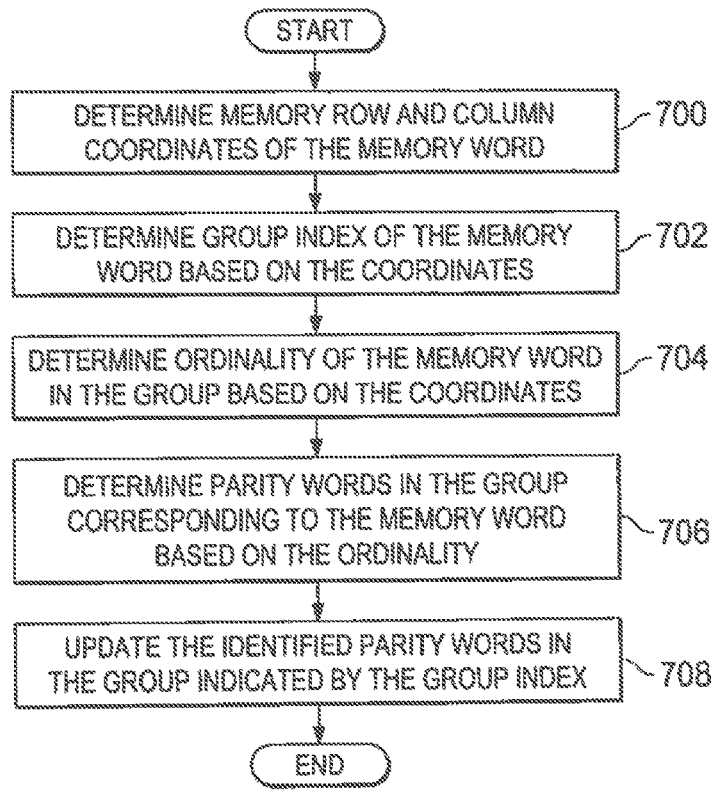
FIG. 7 is a flow diagram of a method for flow diagram of a method for updating parity words of a radar data memory.

FIG. 7 is a flow diagram of a method for updating parity words of a radar data memory assuming the above described Hamming code. The method is performed for a read or a write of a memory word in the radar data memory. The method is explained in reference to the examples of FIG. 8 and FIG. 9 and assumes the grouping of the previous examples. Referring now to FIG. 7, when a memory word is accessed, i.e., read or written, in the radar data memory, e.g., the radar data memory 800 of FIG. 8, the row and column coordinates in the radar data memory of the memory word are determined 700 based on the address of the memory word. Determination of row and column coordinates is previously described herein.

The group index of the memory word is determined 702 based on the row and column coordinates. Assuming the groups are indexed 0, 1, . . . , M−1, an index identifying the group of the memory word, group_idx, may be computed as per $$\text{group\_idx} = \mod(R - \mod(C, M), M)$$

where R is the memory row number and C is the memory column number of the memory word.

Figure 8:
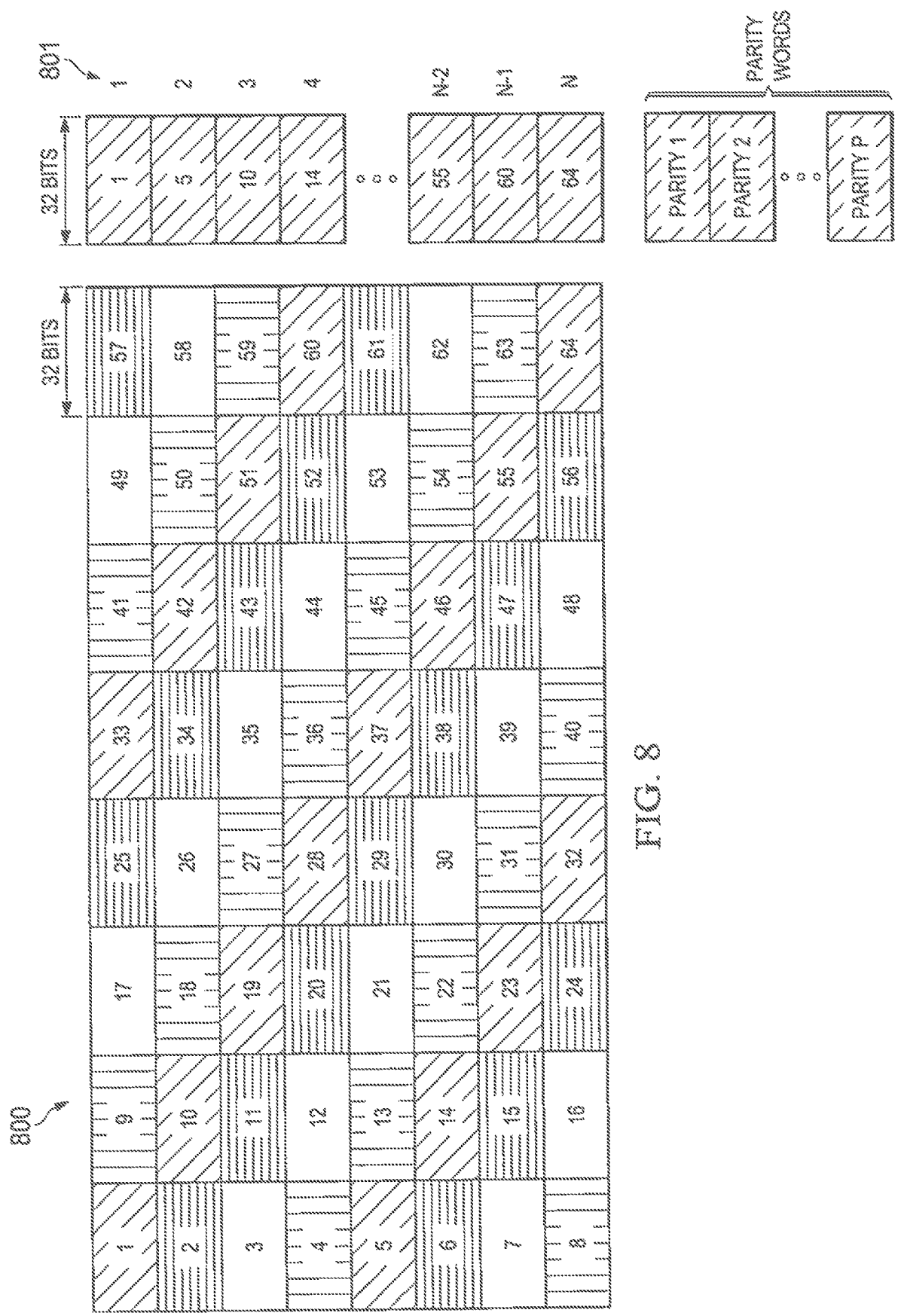
FIG. 8 is an example illustrating ordinality of memory words in a group.

The ordinality k of the memory word in the group to which the word is assigned is determined 704 based on the row and column coordinates. The ordinality k may be computed as per $$k = (\text{numRows}/M) \times C + \text{floor}(R/M) + 1$$

where C is the column coordinate of the memory word, R is the row coordinate of the memory word, and numRows is the number of rows in the radar data memory. The example of FIG. 8 illustrates the ordinality 1, 2, . . . N 801 of words in a group for the radar data memory 800.

The subset of parity words of the group parity words corresponding to the memory word are determined 706 given the ordinality k of the memory word. That is, G(k) is determined. In some embodiments, G(k) may be computed as per the above equation for G(k). In some embodiments, G(k) may be determined by a parity identification circuit such as that of FIG. 6.

The identified parity words are then updated 708. As was previously explained, the particular parity words of the group parity words are identified by the non-zero bit position of the binary representation of G(k). Given G(k) and the group index, the identified parity words in the group parity words are updated by performing an XOR operation between the data of the memory word and the current contents of the identified parity words.

Figure 9:
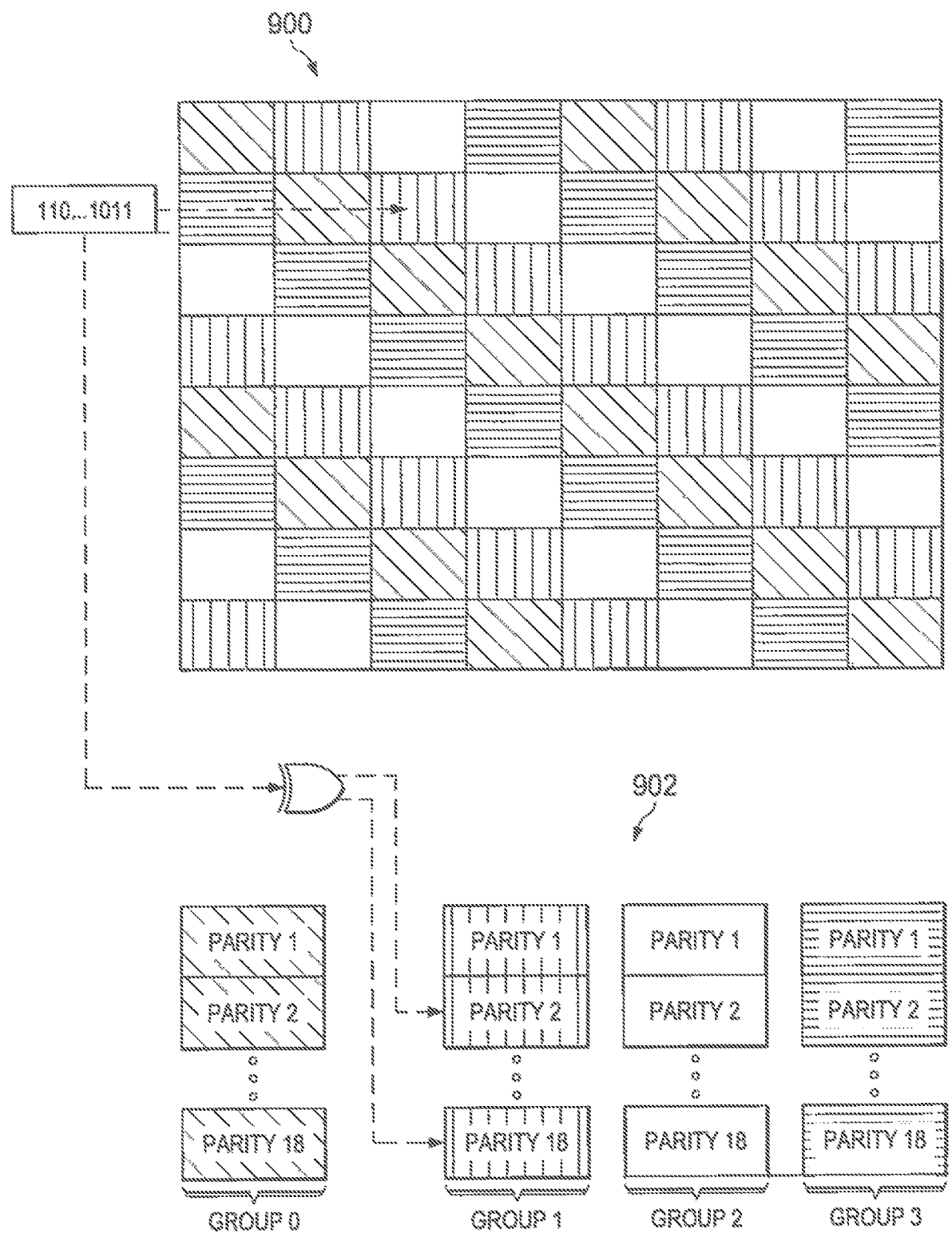
FIG. 9 is an example illustrating the method of FIG. 7.

FIG. 9 is an example illustrating the above method. This figure shows a radar data memory 900 divided into groups and the parity words 902 associated with each group. Assuming a 32-bit word, e.g., 110 . . . 1011 is to be written into the radar data memory at a specified address. As per the steps of the above method, the address is used to identify the row and column of the memory word where this value is to be stored. The ordinality k of the memory word within the group and the group identifier are determined based on the row and column. In this example, the memory word is identified as belonging to the group with a group index of 1. The ordinality k is then used to identify the subset of parity words corresponding to the group that should be updated based on writing the word into memory. The identified parity words are then updated by performing an XOR operation between each of the identified parity words and the data value 110 . . . 1011.

Figure 10:
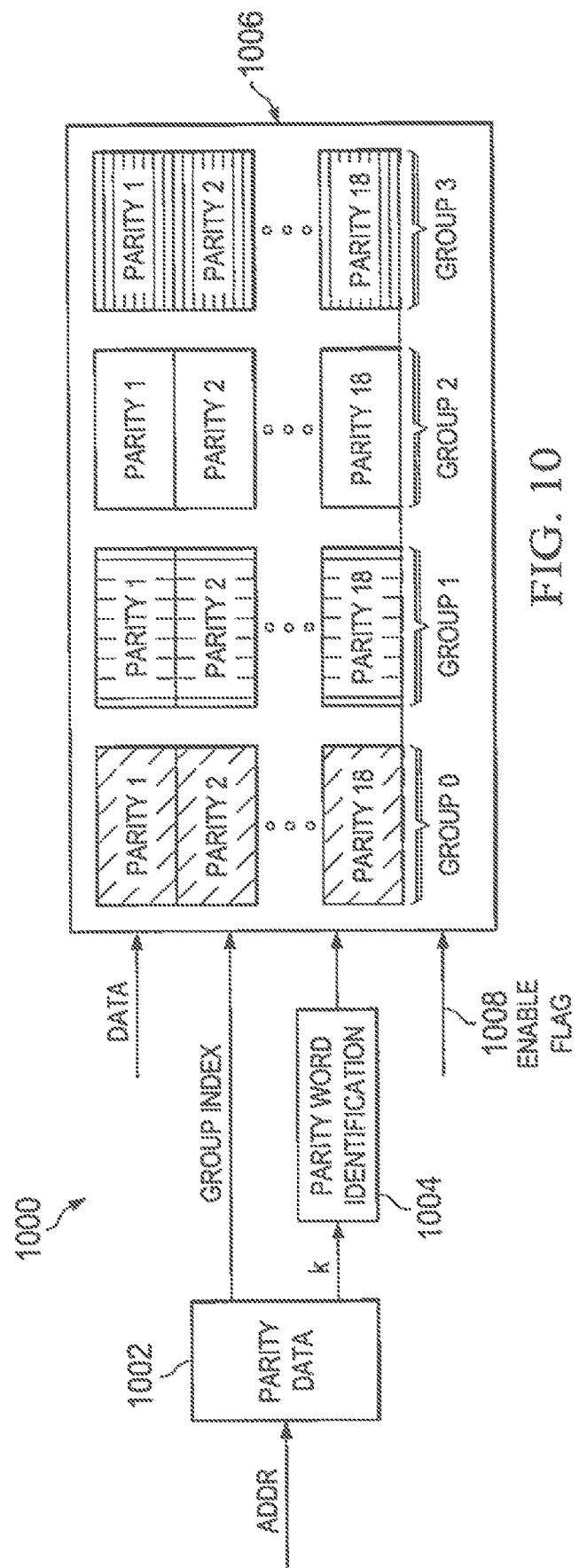
FIG. 10 is a block diagram of an example parity management component.

FIG. 10 is a block diagram illustrating an example parity management component 1000 implementing an embodiment of the above described technique for protecting radar data memory against two soft errors. This example assumes M=4, a memory word is 32 bits, and a radar data memory size of 2 MB. Thus, N=2 MB/4/M=131072, and the value of P may be chosen, for example, as per the previously described relation, i.e., P=18. Given P=18, eighteen 32-bit parity words are needed per group for a total of M*18=72 parity words or 288 bytes.

The parity management component 1000 includes a parity data component 1002, a parity word identification component 1004, and a parity memory 1006. The parity data component 1002 receives the address ADDR of a word in the radar data memory that is read or written. The parity data component 1002 includes functionality to determine the row and column coordinates of the memory location identified by the address. The parity data component 1002 further includes functionality to determine the group index of the memory word and the ordinality k of the memory word in the group to which the word is assigned based on the row and column coordinates. The parity data component 1002 is coupled to the parity memory 1006 to provide the group index of the memory address and to the parity word identification component 1004 to provide the binary representation of the ordinality k of the memory address. Determination of the row and column coordinates, the group index, and the ordinality assuming a diagonal grouping assignment is previously described herein.

The parity word identification component 1004 includes functionality to identify the parity words in a group that are to be updated based on the ordinality k, i.e., functionality to determine G(k). Identification of parity words based on ordinality is previously described herein. In some embodiments, the parity identification component 1004 includes the circuitry of FIG. 6. The parity identification component 1004 is coupled to the parity memory 1006 to provide the binary value of G(k).

The parity memory 1006 includes sufficient memory to store the 72 parity words and functionality to identify the subset of parity words assigned to a group based on the group index and the particular words in the group to be updated based on the binary value provided by the parity word identification component. The parity memory 1006 further includes functionality to receive the data corresponding to the address ADDR and to XOR that data with the parity words identified by the group index and the non-zero bits in the binary value.

The parity memory 1006 may also be coupled to receive the value of an enable flag 1008. The value of this flag indicates whether or not parity is to be updated for the current memory access. As was mentioned previously, the radar data memory protection assumes that during processing of data corresponding to a frame of chirps, each memory location is read and written an equal number of times. More specifically, for each write of a value to a memory word during which parity is updated, a single read of the value from the memory word during which parity is also updated must be performed. During post-processing, e.g., after the Doppler FFTs, there may be a need to read some of the data without updating the corresponding parity bits. In such instances, the value of this flag is set to indicate no parity updates.

Figure 11:
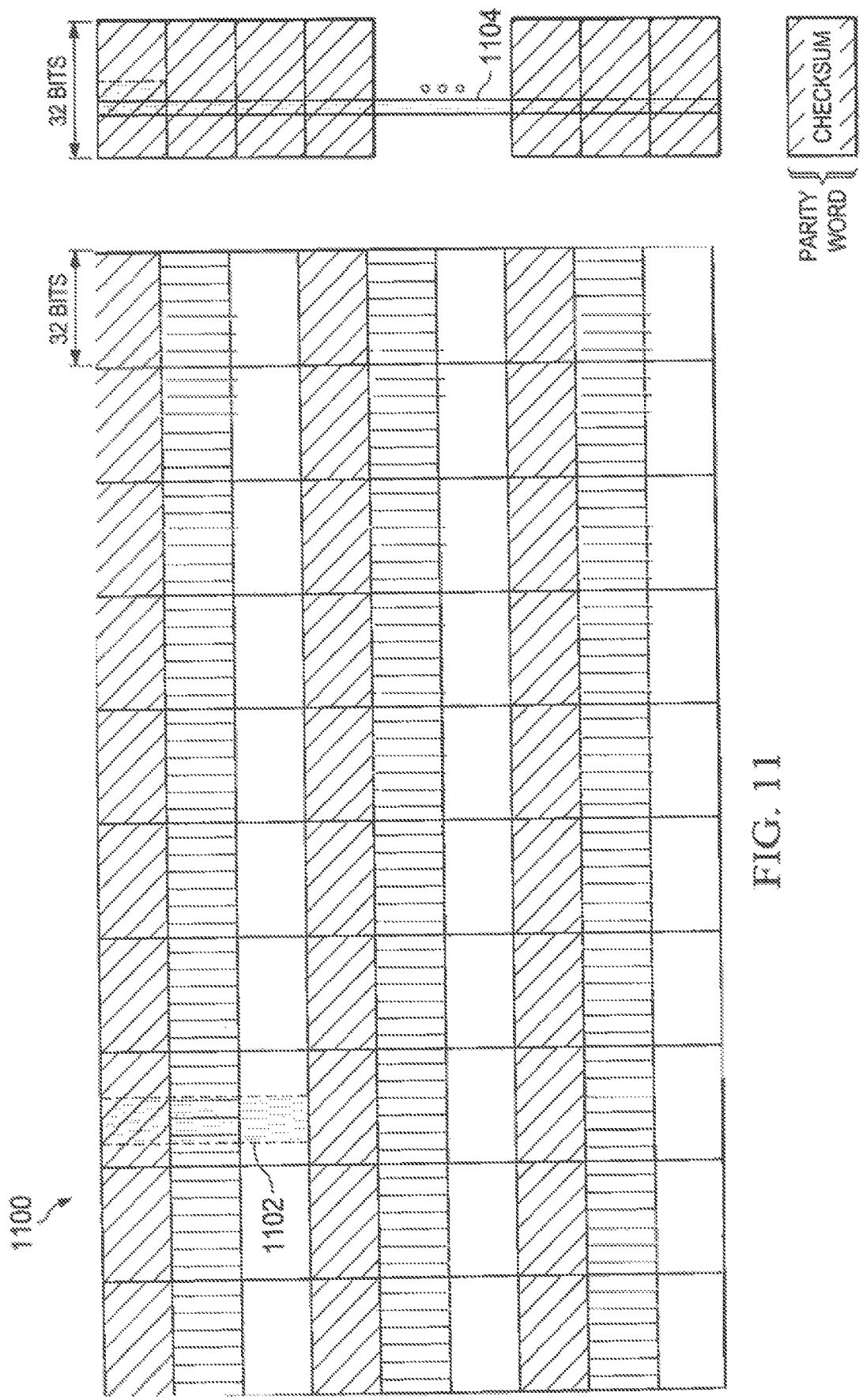
FIG. 11 is an example illustrating parity bit assignment for radar data memory for protection against one soft error occurrence with a row wise memory grouping.
Figure 12:
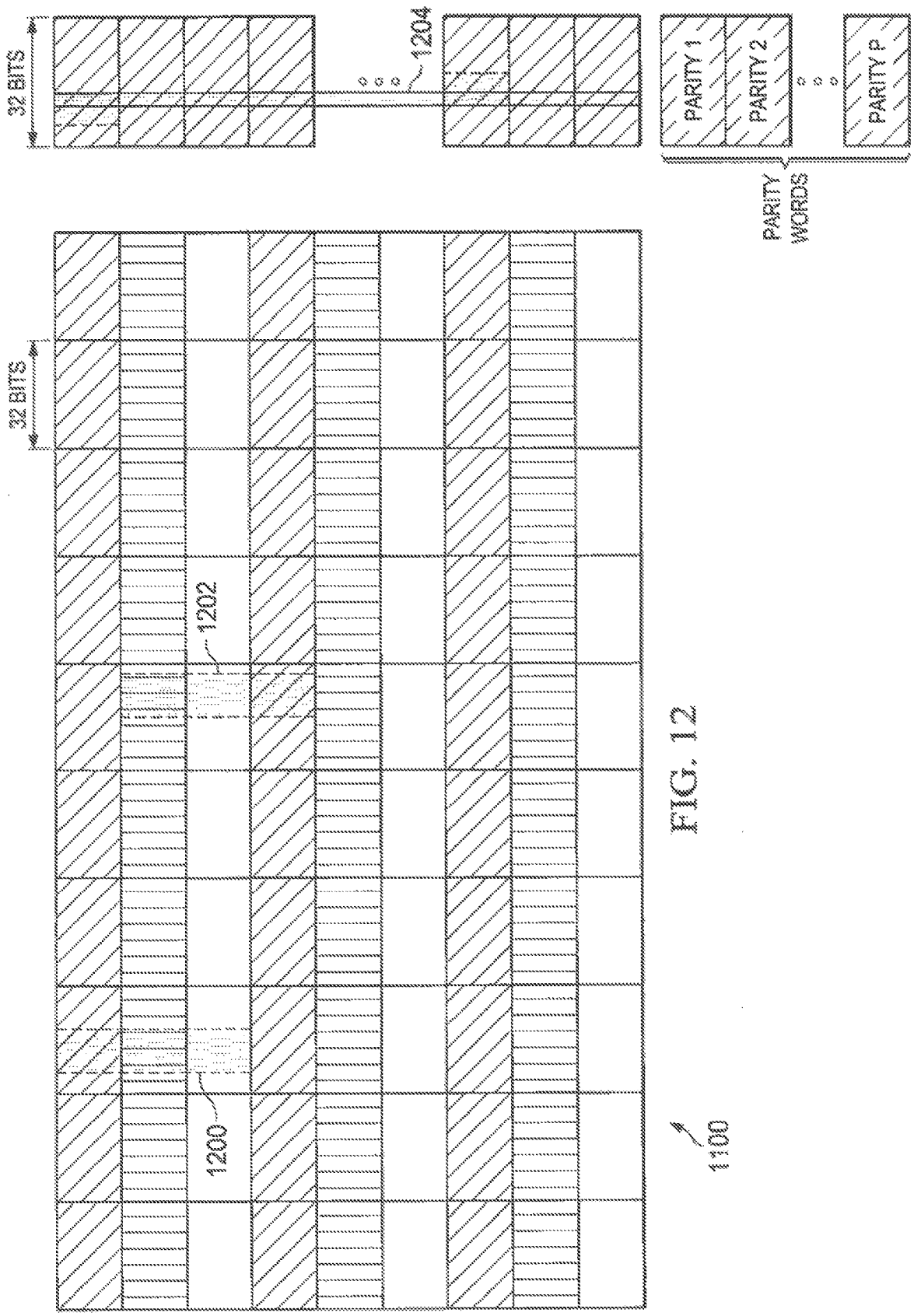
FIG. 12 is an example illustrating parity bit assignment for radar data memory for protection against two soft error occurrences with a row wise memory grouping.

The example figures previously described assumed a diagonal pattern for grouping radar data memory words. Other grouping techniques may be used as long as the property that a single soft error can affect a maximum of one word per group is preserved. FIG. 11 and FIG. 12 are examples illustrating an alternate grouping pattern for a radar data memory 1100 assuming M=4 and a 32-bit memory word in which memory words are assigned to groups by row.

FIG. 11 is an example illustrating parity bit assignment for protection against a single soft error occurrence with this row-wise grouping pattern. In this example, memory words in rows 1, 4, and 7 are in the same group. The M×M area 1102 illustrates an example portion of memory that may be affected by a single soft error. As with the example of FIG. 3, a parity bit is allocated for the protection of each of the 32 bit positions. On the right side of FIG. 11, the memory words for the example group are stacked vertically for illustration and the associated 32-bit parity word is shown below the stack. An example column 1104 of bits at an illustrative bit position in each word of the group along with the associated parity bit in the parity word is also shown. The method of FIG. 4 for single soft error protection may be used with a row-wise grouping with a modification to the way the group index is determined.

FIG. 12 is an example illustrating parity bit as for protection against two soft errors using the row-wise grouping pattern. In this example, memory words in rows 1, 4, and 7 are in the same group. The M×M area 1200 and the M×M area 1202 illustrate example portions of memory that may be affected by two soft errors. As with the example of FIG. 5, a set of P parity bits is allocated for the protection of each bit position of the words assigned to a group. On the right side of FIG. 12, the memory words for the example group are stacked vertically for illustration and the 32-bit parity words corresponding to the group are shown below the stack. An example column 1204 of bits at an illustrative bit position in each word of the group along with the associated parity bits in the parity words is also shown. The method of FIG. 7 for protection from two soft errors may be used with a row-wise grouping with some changes to the group index and ordinality equations. More specifically, the group index may be computed as per group_idx=mod($R,M$)

and the ordinality k may be computed as per $k$=NumColumns×floor($R/M$)+$C$.

Figure 13:
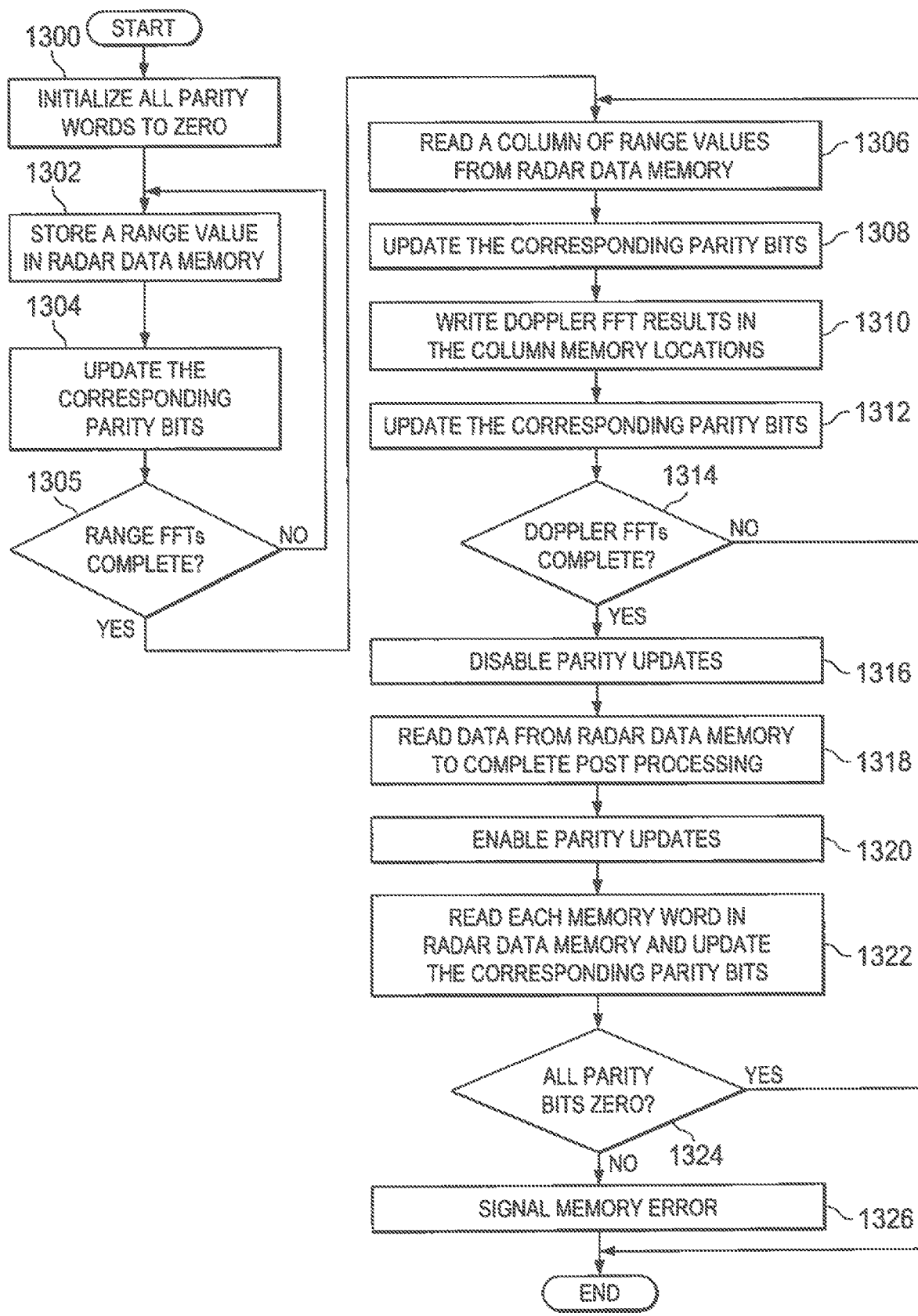
FIG. 13 is a flow diagram of a method for protection of a radar data memory in a radar system.
Figure 14:
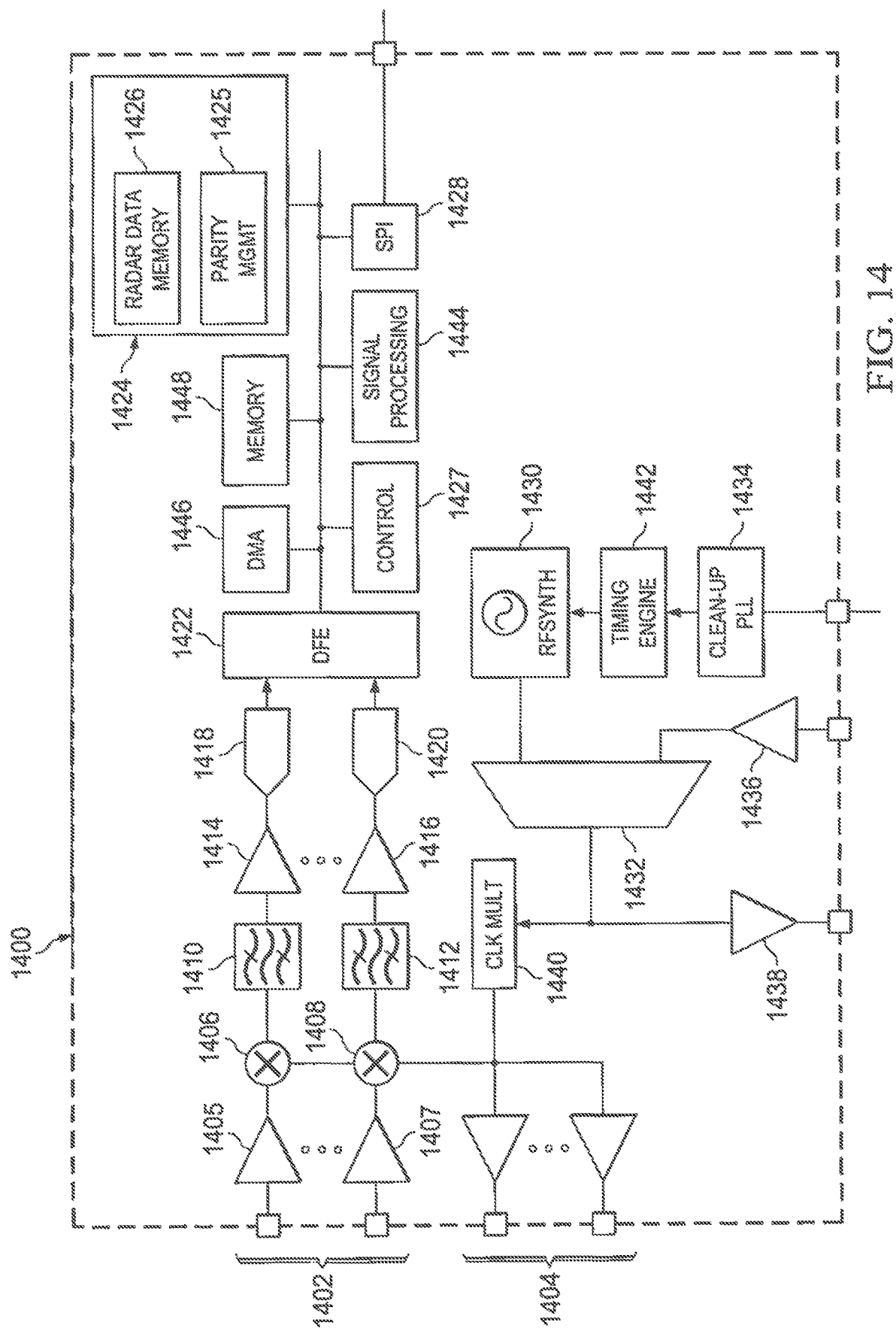
FIG. 14 is a block diagram of an example Frequency Modulated Continuous Wave (FMCW) radar system.

FIG. 13 is a flow diagram of a method for protection of a radar data memory in a radar system such as, for example, the radar system of FIG. 14. This method may be performed during the processing of the radar data corresponding to a frame of chirps. Prior to storing data in the radar data memory, all the parity words are initialized 1300 to zero. As pre-processing of digitized IF signals is performed, i.e., as range FFTs are applied to the incoming digitized samples to generate range values, each range value is stored 1302 in a memory word in the radar data memory and the parity bits corresponding to the memory word are updated 1304. The storing of range values and the parity updating continues until range FFTs are complete 1305, i.e., the pre-processing is completed.

Once all of the range values corresponding to the frame are stored 1305 in the radar data memory, the post-processing is initiated. During the post-processing, Doppler FFTs are performed in which each column of range values is read 1306 from the radar data memory, a Doppler FFT performed on the range values, and the resulting Doppler FFT values are written 1310 in the radar data memory in the memory locations that stored the column of range values. The parity bits corresponding to each memory word of the column of range values are updated 1308 when the column of range values is read. Similarly, the parity bits corresponding to each memory word where a value of the Doppler FFT is stored are updated 1312 when the value is written to the memory word.

Once the Doppler FFTs are complete 1314, parity updates are disabled 1316, and some of the data is read 1318 from the radar data memory to complete the post processing, e.g., to detect objects and to identify the range, velocity and angle of arrival of detected objects. Once the post processing is complete, parity updates are enabled 1320.

Each memory word in the radar data memory that was used to store radar data during the pre and post processing is then read 1322 to trigger an update 1322 of the corresponding parity bits. Note that once this step is complete, the memory words have been read and written an equal number of times for parity updating. The parity bits are then checked 1324 for a memory error. If all the parity bits are zero 1324, no error has occurred; otherwise, a memory error is signaled 1326.

The updating of the parity bits corresponding to a memory word may be performed using the method of FIG. 4 if an embodiment of single soft error memory protection as described is implemented by the radar system. The updating of the parity bits corresponding to a memory word may be performed using the method of FIG. 7 if an embodiment of two soft error memory protection as described herein is implemented by the radar system.

FIG. 14 is a block diagram of an example FMCW radar system 1400 configured to perform radar data memory protection as described herein. In this embodiment, the radar system is a radar integrated circuit (IC) suitable for use in embedded applications. The radar IC 1400 may include multiple transmit channels 1404 for transmitting FMCW signals and multiple receive channels 1402 for receiving the reflected transmitted signals. Any suitable number of receive channels and transmit channels and the number of receive channels and the number of transmit channels may differ.

A transmit channel includes a suitable transmitter and antenna. A receive channel includes a suitable receiver and antenna. Further, each of the receive channels 1402 are identical and include a low-noise amplifier (LNA) 1405, 1407 to amplify the received radio frequency (RF) signal, a mixer 1406, 1408 to mix the transmitted signal with the received signal to generate an intermediate frequency (IF) signal (alternatively referred to as a dechirped signal, beat signal, or raw radar signal), a baseband bandpass filter 1410, 1412 for filtering the beat signal, a variable gain amplifier (VGA) 1414, 1416 for amplifying the filtered IF signal, and an analog-to-digital converter (ADC) 1418, 1420 for converting the analog IF signal to a digital IF signal.

The receive channels 1402 are coupled to a digital front end (DFE) component 1422 to provide the digital IF signals to the DFE 1422. The DFE includes functionality to perform decimation filtering on the digital IF signals to reduce the sampling rate and bring the signal back to baseband. The DFE 1422 may also perform other operations on the digital IF signals, e.g., DC offset removal. The DFE 1422 is coupled to the signal processor component 1444 to transfer the output of the DFE 1422 to the signal processor component 1444.

The signal processor component 1444 is configured to perform signal processing on the digital IF signals of a frame of radar data to detect any objects in the FOV of the radar system 1400 and to identify the range, velocity and angle of arrival of detected objects. The signal processor component 1444 is coupled to the radar data storage component 1424 to read and write data to the radar data memory 1426 during the signal processing.

To perform the signal processing, e.g., the previously described pre-processing and post processing, the signal processor component 1444 executes software instructions stored in the memory component 1448. These software instructions may include instructions to check the parity bits of the radar data storage component 1424 for memory errors after processing data corresponding to a frame of chirps. Further, the software instructions may cause the results of the signal processing to be ignored if a memory error is indicated.

The signal processor component 1444 may include any suitable processor or combination of processors. For example, the signal processor component 1444 may be a digital signal processor, an MCU, an FFT engine, a DSP+MCU processor, a field programmable gate array (FPGA), or an application specific integrated circuit (ASIC).

The radar data storage component 1424 provides protected radar data storage according to an embodiment of the radar data memory protection techniques described herein. The radar data storage component 1424 includes a parity management component 1425 and a radar data memory component 1426. The radar data memory component 1426 may be any suitable random access memory (RAM), e.g., static RAM. The radar data memory component 1426 includes sufficient memory to store radar data corresponding to the largest expected frame of chirps.

The parity management component 1425 implements parity updating for the radar data memory component 1426. In some embodiments, the parity management component 1425 implements an embodiment of the previously described parity scheme for protection against a single soft error in the radar data memory component 1426. In such embodiments, a parity bit is allocated for the protection of each bit position of the memory words assigned to a group. Thus, if a memory word is $N_w$ bits, $N_w$ parity bits are needed for a group. The parity management component 1425 includes sufficient storage for the $N_w$-bit parity information for each group. Further, the parity management component 1425 includes functionality to implement an embodiment of the method for updating parity words of FIG. 4.

In some embodiments, the parity management component 1425 implements an embodiment of the previously described parity scheme for protection against two soft errors in the radar data memory component 1426. In such embodiments, as previously described, a column of parity bits is allocated for the protection of each bit position column of the memory words assigned to a group. Thus, if a memory word is $N_w$ bits, $N_w$ columns of parity bits are needed for a group. The number of parity bits P in a column of parity bits depends on the number of memory words in a group. The choice of the value of P is previously described herein. Thus, $P*N_w$ parity bits are needed for a group. The parity management component 1425 includes sufficient storage for the $P*N_w$-bit parity information for each group. Further, the parity management component 1425 includes functionality to implement an embodiment of the method for updating parity words of FIG. 7. In some embodiments, the parity management component 1425 may be implemented as per the parity management component 1000 of FIG. 10 appropriately configured for the amount of memory in the radar data memory component 1426.

In some embodiments, the parity management component 1425 includes an input for an enable flag (not shown). In such embodiments, the parity management component 1425 performs parity updates when words of the radar data memory component 1426 are read or written unless this flag is set to indicate parity updates are not to be performed. The signal processing software executed by the signal processing component 1444 may set this flag as needed during the processing of the data corresponding to a frame of chirps to ensure that the parity bits corresponding to each memory word are updated by an equal number of reads and writes. For example, as described in reference to the method of FIG. 13, the parity updating may be disabled during part of the post-processing.

The on-chip memory component 1448 provides on-chip storage, e.g., a computer readable medium that may be used, for example, to communicate data between the various components of the radar IC 1400, to store software programs executed by processors on the radar IC 1400, etc. The on-chip memory component 1448 may include any suitable combination of read-only memory and/or random access memory (RAM), e.g., static RAM.

The direct memory access (DMA) component 1446 is coupled to the radar data storage component 1424 to perform data transfers between the radar data memory 1426 and the signal processor component 1444.

The control component 1427 includes functionality to control the operation of the radar IC 1400. The control component 1427 may include, for example, an MCU that executes software to control the operation of the radar IC 1400.

The serial peripheral interface (SPI) 1428 provides an interface for external communication of the results of the radar signal processing. For example, the results of the signal processing performed by the signal processor component 1444 may be communicated to another processor for application specific processing such as object tracking, rate of movement of objects, direction of movement, etc.

The programmable timing engine 1442 includes functionality to receive chirp parameter values for a sequence of chirps in a radar frame from the control module 1427 and to generate chirp control signals that control the transmission and reception of the chirps in a frame based on the parameter values. The chirp parameters are defined by the radar system architecture and may include, for example, a transmitter enable parameter for indicating which transmitters to enable, a chirp frequency start value, a chirp frequency slope, an analog-to-digital (ADC) sampling time, a ramp end time, a transmitter start time, etc.

The radio frequency synthesizer (RFSYNTH) 1430 includes functionality to generate FMCW signals for transmission based on chirp control signals from the timing engine 1442. In some embodiments, the RFSYNTH 1430 includes a phase locked loop (PLL) with a voltage controlled oscillator (VCO).

The multiplexor 1432 is coupled to the RFSYNTH 1430 and the input buffer 1436. The multiplexor 1432 is configurable to select between signals received in the input buffer 1436 and signals generated by the RFSYNTH 1430. The output buffer 1438 is coupled to the multiplexor 1432 and may be used, for example, to transmit signals selected by the multiplexor 1432 to the input buffer of another radar IC.

The clock multiplier 1440 increases the frequency of the transmission signal to the frequency of the mixers 1406, 1408. The clean-up PLL (phase locked loop) 1434 operates to increase the frequency of the signal of an external low frequency reference clock (not shown) to the frequency of the RFSYNTH 1434 and to filter the reference clock phase noise out of the clock signal.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein assuming that the number of groups of radar data memory words is four, i.e., M=4. One of ordinary skill in the art will understand embodiments in which number of groups is more or less than four.

In another example, embodiments have been described herein assuming that no bit packing or memory compression is used such that a subset of bits in a memory word is accessed. One of ordinary skill in the art will understand embodiments in which bit packing/memory compression is used. For example, the data used for parity updating may be zero filled to avow the XOR operation with the full parity word. For example, if bits 8 to 15 of a 32 bit word are accessed, the 32-bit data used for parity updating can include these bits with zeros in the other bit positions. In another example, only the parity bits corresponding to the bits accessed are updated. For example, if bits 8 to 15 of a 32-bit word are accessed, then bits 8 to 15 of the parity word or words are updated.

In another example, embodiments have been described herein assuming a diagonal grouping form top left to bottom right. One of ordinary skill in the art will understand embodiments in which the diagonal grouping is from bottom left to top right.

In another example, some embodiments have been described herein in which the radar system is an embedded radar system in a vehicle. One of ordinary skill in the art will understand embodiments for other applications of embedded radar systems, e.g., surveillance and security applications, maneuvering a robot in a factory or warehouse, etc.

In another example, some embodiments have been described herein in the context of an FMCW radar system. One of ordinary skill in the art will understand embodiments for other radar systems in which the signal processing of radar signals is performed such that each memory word is written and read an equal number of times.

In another example, embodiments of the memory protection have been described herein in the context of an FMCW radar system. One of ordinary skill in the art will understand embodiments for other signal processing systems used in safety critical applications in which a large amount of data is stored for signal processing and the data accesses corresponding to the signal processing are such that an equal number of read and write accesses per memory word can be ensured, either with the parity enable flag (in some embodiments) or without the parity enable flag (in some embodiments).

In another example, embodiments have been described herein in which memory is grouped such that single soft error affects only one memory word per group and a checksum based technique is used for protecting against a single soft error and a Hamming code technique is used for protecting against two soft errors. One of ordinary skill in the art will understand embodiments in which a less efficient memory word grouping is used. For example, a grouping may be used such that a single soft error affects two memory words in a group. One of ordinary skill in the art will also understand embodiments in which a Hamming code may be used to protect against a single soft error.

Although method steps may be presented and described herein in a sequential fashion, one or more of the steps shown in the figures and described herein may be performed concurrently, may be combined, and/or may be performed in a different order than the order shown in the figures and/or described herein. Accordingly, embodiments should not be considered limited to the specific ordering of steps shown in the figures and/or described herein.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the description and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fail within the true scope of the disclosure.

What is claimed is:

1. An apparatus, comprising:
   a parity memory component associated with a data memory component enabled to store a plurality of parity bits including a set of group parity bits for each group of memory words of a plurality of groups of memory words in the data memory component; and
   a parity management component coupled to the parity memory component and enabled to receive an address of a memory word in the data memory component and a data read from or written to the memory word during signal processing, the parity management component configured to update group parity bits in the plurality of parity bits stored in the parity memory component corresponding to the address of the memory word based on the data.

2. The apparatus of claim 1, in which the plurality of groups are non-overlapping groups of memory words in which a single soft error can affect only one memory word per group.

3. The apparatus of claim 1, in which the signal processing is configured to write and read each memory word of a plurality of memory words of the data memory such that for each write of a data to a memory word location (or address or position) of the plurality of memory words, group parity bits corresponding to a group of the memory words are updated based on the data and a single read of the data from the memory word location (or address or position) is performed in which the group parity bits are updated based on the data.

4. The apparatus of claim 3, in which the parity management component is coupled to receive a parity enable flag indicating whether or not parity updates are enabled, and in which the signal processing is configured to manage the parity enable flag to ensure that for each write of a data to a memory word location (or address or position) with parity updates enabled, a single read of the data from the memory word location (or address or position) is performed with parity updates enabled.

5. The apparatus of claim 1, in which the apparatus is a radar system and at least one digital signal received by the apparatus is a plurality of digital intermediate frequency (IF) signals generated by a plurality of receive channels of the radar system, each receive channel configured to receive a reflected signal from transmission of a frame of chirps and to generate a digital IF signal of samples of the reflected signal.

6. The apparatus of claim 5, in which the signal processing is configured to:
   write first data corresponding to the plurality of digital IF signals into a plurality of memory word locations (or addresses or positions) in the data memory, in which, for each memory word of the plurality of memory word locations (or addresses or positions), the parity management component updates the group parity bits in the plurality of parity bits corresponding to a group of the memory words based on the first data written in the memory word locations (or addresses or positions); and
   read the first data from the plurality of memory word locations (or addresses or positions), in which, for each memory word of the plurality of memory word locations (or addresses or positions), the parity management component updates the group parity bits corresponding to the group of the memory words based on of the first data read from the memory word locations (or addresses or positions).

7. The apparatus of claim 6, in which the signal processing is configured to:
   write second data corresponding to the plurality of digital IF signals into the plurality of memory word locations (or addresses or positions) in the data memory, in which for each memory word in the plurality of memory word locations (or addresses or positions), group parity bits corresponding to the group of the memory words are updated based on the second data written into the memory word location (or address or position);

read the second data from the plurality of memory word locations (or addresses or positions), in which for each memory word in the plurality of memory word locations (or addresses or positions), the group parity bits corresponding to the group of the memory words are updated based on the second data read from the memory word location (or address or position); and perform signal processing on the second data to generate the first data.

8. The apparatus of claim 1, in which each set of group parity bits consists of a parity bit for each bit position of a memory word.

9. The apparatus system of claim 1, in which each set of group parity bits consists of P parity bits for each bit position of a memory word, in which a value of P depends on a number of words N in a group, P and N being positive integers greater than one.

10. The apparatus of claim 9, in which the value of P is chosen as a smallest value that satisfies $N>2^P-P-1$.

11. The apparatus of claim 9, in which the parity management component is configured to determine a subset of group parity bits corresponding to a memory word of a group based on ordinality of the memory word in the group.

12. The apparatus of claim 11, in which the parity management component includes a parity identification circuit configured to determine the subset of group parity bits corresponding to a memory word of a group, the parity identification circuit including:

a first component coupled to receive a binary representation of the ordinality of the memory word, the first component configured to output a first binary representation of an index of a left most non-zero bit of the binary representation of the ordinality;

a first adder coupled to the first component to receive the first binary representation and coupled to receive the binary representation of the ordinality, the first adder configured to output a second binary representation of a sum of the first binary representation and the binary representation of the ordinality;

a second component coupled to the first adder to receive the second binary representation, the second component configured to output a third binary representation of an index of a left most non-zero bit of the second binary representation; and a second adder coupled to the second component to receive the third binary representation and coupled to receive the binary representation of the ordinality, the second adder configured to output a fourth binary representation of a sum of the third binary representation and the binary representation of the ordinality.

13. A method for data memory protection in an apparatus, the method comprising:

dividing memory words of a data memory of the apparatus into a plurality of groups, in which a plurality of parity bits associated with the data memory includes a set of group parity bits for each group of the plurality of groups; and performing signal processing on a least one digital signal received by the apparatus, in which each memory word of a plurality of memory words of the data memory is written and read such that for each write of data to a memory word location (or address or position) of the plurality of memory words, group parity bits corresponding to a group of the memory word locations (or addresses or positions) are updated based on the data and a single read of the data from the memory word is performed in which the group parity bits are updated based on the read data.

14. The method of claim 13, further including determining whether a soft error has occurred based on the plurality of parity bits.

15. The method of claim 13, in which the plurality of groups are non-overlapping groups of memory words in which a single soft error can affect only one memory word per group.

16. The method of claim 15, in which each set of group parity bits consists of a parity bit for each bit position of a memory word.

17. The method of claim 15, in which each set of group parity bits consists of P parity bits for each bit position of a memory word, in which a value of P depends on a number of words N in a group, P and N being positive integers greater than one.

18. The method of claim 17, in which the value of P is chosen as a smallest value that satisfies $N>2^P-P-1$.

19. The method of claim 17, in which a subset of group parity bits corresponding to a memory word of a group are determined based on ordinality of the memory word in the group.

20. The method of claim 13, in which performing signal processing includes disabling parity updates to allow a read of the data from the memory word location (or address or position) without changing the group parity bits.

21. The method of claim 13, in which the apparatus is a radar system and the at least one digital signal is a plurality of digital intermediate frequency (IF) signals generated by a plurality of receive channels in the radar system.

22. The method of claim 21, in which performing signal processing includes:

writing first data corresponding to signal processing of the digital IF signals into the plurality of memory word locations (or addresses or positions), in which for each memory word in the plurality of memory words, group parity bits corresponding to a group of the memory words are updated; and reading the first data from the plurality of memory word locations (or addresses or positions), in which for each memory word in the plurality of memory words, the group parity bits corresponding to the group of the memory word are updated.

23. The method of claim 22, in which performing signal processing includes:

writing second data corresponding to signal processing of the digital IF signals into the plurality of memory word locations (or addresses or positions), in which for each memory word in the plurality of memory word locations (or addresses or positions), group parity bits corresponding to the group of the memory word are updated;

reading the second data from the plurality of memory word locations (or addresses or positions), in which for each memory word in the plurality of memory word locations (or addresses or positions), the group parity bits corresponding to the group of the memory words are updated; and performing signal processing on the second data to generate the first data.

* * * * *